Patented Nov. 26, 1940

2,222,931

UNITED STATES PATENT OFFICE 2,222,931

PROCESS FOR PRODUCING TETRACHLORETHYLENE

Georg Basel, deceased, late of Burghausen, Upper Bavaria, Germany, by Therese Basel, sole heir, Burghausen, Upper Bavaria, Germany, and Erich Schaeffer, Burghausen, Upper Bavaria, Germany; said Georg Basel and said Erich Schaeffer assignors to Dr. Alexander Wacker Gesellschaft für Elektrochemische Industrie, G. m. b. H., Munich, Bavaria, Germany, a corporation No Drawing. Original application February 19, 1938, Serial No. 191,576. Divided and this application September 26, 1939, Serial No. 296,688. In Germany February 22, 1937

4 Claims. (Cl. 260—654)

This invention relates to the production of tetrachlorethylene and is a division of our copending application Serial No. 191,576, filed February 19, 1938, now Patent No. 2,178,622, issued November 7, 1939.

Tetrachlorethylene is usually obtained from pentachlorethane through the splitting off of hydrochloric acid. If an attempt is made to produce tetrachlorethylene by the reaction of acetylene and chlorine, an uncontrollable and very violent reaction takes place, so that such a process cannot be used in practice.

We have found that this reaction occurs without any danger and with the almost complete transformation of the initial substances if the chlorine, diluted with tetrachlorethylene and hexachlorethane vapor is brought in contact with acetylene at an elevated temperature. For this purpose tetrachlorethylene and hexachlorethane may first be mixed with chlorine. It is, however, simpler if the procedure is carried out continuously as follows: Chlorine is first allowed to react upon tetrachlorethylene at an elevated temperature so that a gaseous mixture of tetrachlorethylene, hexachlorethane and chlorine is produced. This gaseous mixture is then conducted into a catalyst chamber which is continuously supplied with acetylene. In this way tetrachlorethylene and hydrochloric acid are generated in practically theoretical quantity without violent reactions or explosions.

The foregoing reaction is generally carried out at a temperature of 200–400° C. and above. The application of pressure above atmospheric renders possible, it is true, an increase in the output, but raises the cost of the equipment. As contact surfaces, dense bodies, such as porcelain or glass shards, may be used. More favorable is the application or use of porous contacts, particularly highly activated charcoal, animal charcoal, live carbon, silica gel and the like. These are particularly durable if they are impregnated with substances which are known to have the faculty of promoting the splitting off of hydrochloric acid, such for instance as chlorine derivatives of bivalent elements such as copper chloride and the like. The tetrachlorethylene obtained according to the invention may be used for effecting chemical conversions, or it may be used as a solvent for extraction, for cleaning fabrics, metals, etc.

Example

The apparatus consists of an evaporator and a preheater which is filled, for instance, with sand and to which the catalyst chamber, heated to about 200–400° C., is attached. The catalyst chamber contains activated carbon. Tetrachlorethylene and chlorine are continuously fed to the evaporator and the vapor or gas mixture is heated, by being passed through the preheater, to about 200° C. It then enters the reaction chamber proper into which acetylene is continuously fed. From the reaction chamber there issues a mixture of tetrachlorethylene and hydrochloric acid gas, which is cooled, whereby the first mentioned gas is separated from the latter. The tetrachlorethylene obtained is very pure, and it may contain small quantities of hexachlorethane. The feeding of chlorine and acetylene is so adjusted that it corresponds to the following equation:

$$C_2H_2 + 3Cl_2 = C_2Cl_4 + 2HCl$$

If an excessive amount of acetylene is used, then dichlorethylene and trichlorethylene are generated in addition to tetrachlorethylene. With an excess of chlorine small quantities of hexachlorethane and carbon tetrachloride are generated in addition to tetrachlorethylene.

The invention claimed is:

1. Process for producing tetrachlorethylene which comprises reacting chlorine upon tetrachlorethylene at a temperature of 200 to 400° C. to produce a gaseous mixture of tetrachlorethylene, hexachlorethane and chlorine, and then subjecting such mixture to the action of acetylene in the presence of contact surfaces heated to a temperature of 200 to 400° C.

2. Process according to claim 1, in which a porous substance is used for the contact surfaces.

3. Process according to claim 1, in which the contact surfaces are porous and are impregnated with a substance having the property of promoting the splitting off of hydrochloric acid.

4. Process according to claim 1, in which the reacting gases are passed in contact with porous substances selected from the group consisting of charcoal and silica gel.

THERESE BASEL,
Principal Heir of the Estate of Georg Basel, Deceased.

ERICH SCHAEFFER.